United States Patent
Woollenweber

(10) Patent No.: US 8,784,036 B2
(45) Date of Patent: Jul. 22, 2014

(54) AIR-COOLED TURBOCHARGER WITH OPTIONAL INTERNAL PRESSURE RELIEF VALVE

(76) Inventor: William E. Woollenweber, Carlsbad, CA (US)

(*) Notice: Subject to any disclaimer, the term of this patent is extended or adjusted under 35 U.S.C. 154(b) by 1055 days.

(21) Appl. No.: 12/803,618

(22) Filed: Jul. 1, 2010

(65) Prior Publication Data
US 2012/0003081 A1    Jan. 5, 2012

(51) Int. Cl.
| F01D 25/22 | (2006.01) |
| F01D 5/08 | (2006.01) |
| F02C 6/12 | (2006.01) |
| F01D 25/12 | (2006.01) |

(52) U.S. Cl.
CPC . *F01D 5/082* (2013.01); *F02C 6/12* (2013.01); *F05D 2260/52* (2013.01); *F01D 25/12* (2013.01); *F01D 5/087* (2013.01)
USPC .......................................... 415/112

(58) Field of Classification Search
USPC ............... 415/1, 112, 144, 145, 229; 417/408
See application file for complete search history.

(56) References Cited

U.S. PATENT DOCUMENTS

| 4,808,091 | A | * | 2/1989 | Ruetz ............................ 417/407 |
| 4,812,108 | A | * | 3/1989 | Kotera ........................... 417/368 |
| 5,160,246 | A | * | 11/1992 | Horiuchi ........................ 417/365 |
| 5,248,245 | A | * | 9/1993 | Behnke et al. ................. 417/366 |
| 5,407,331 | A | * | 4/1995 | Atsumi .......................... 417/420 |
| 5,641,275 | A | * | 6/1997 | Klein et al. .................... 417/420 |
| 6,926,490 | B2 | * | 8/2005 | McAuliffe et al. ............... 415/1 |
| 7,025,579 | B2 | * | 4/2006 | Woollenweber et al. ...... 417/407 |
| 7,108,488 | B2 | * | 9/2006 | Larue et al. ................... 417/407 |
| 7,140,848 | B2 | * | 11/2006 | Jaisle ............................ 417/407 |
| 7,677,041 | B2 | | 3/2010 | Woollenweber |
| 2006/0248887 | A1 | * | 11/2006 | Arnold ............................ 60/599 |

* cited by examiner

*Primary Examiner* — Edward Look
*Assistant Examiner* — William Grigos
(74) *Attorney, Agent, or Firm* — Donn K. Harms

(57) ABSTRACT

A cooling system for a turbocharger that has a cooling jacket in the bearing housing wherein air is bled from the area behind the compressor wheel and introduced into the cooling jacket, through which it circulates and then exits into the atmosphere. In addition, a pressure relief valve located behind the compressor wheel is set to open at a predetermined charge air pressure level to introduce additional cooling air into the cooling jacket and also acts to limit the maximum rotational speed of the turbocharger over the high-speed range of the engine on which the turbocharger is mounted. In an alternate embodiment of the invention, cooling air can be taken from the intake manifold system of a turbocharged engine downstream of an air-to-air aftercooler and ducted to the cooling jacket in the turbocharger bearing housing.

15 Claims, 4 Drawing Sheets

AIR-COOLED TURBOCHARGER WITH OPTIONAL INTERNAL PRESSURE RELIEF VALVE

FIELD OF THE INVENTION

This invention relates to turbochargers used on internal combustion engines, and more particularly to turbochargers in which the bearings that carry the rotating parts of the turbocharger need cooling.

BACKGROUND OF THE INVENTION

Turbochargers that are used on both diesel and gasoline engines to increase power output, reduce fuel consumption and reduce emissions have reached an advanced stage of development. The higher mileage and emission standards set by the Obama administration, which begin to take effect in 2012 and are to be achieved by 2016, will necessitate changes to the American car and truck fleet. Passenger cars will be required to get 39 miles per gallon, and light trucks to get 30 miles per gallon. Some U.S. car manufacturers are already taking advantage of turbochargers to help achieve these goals. A news release announced in May of 2009, that Ford Motor Company had started producing its EcoBoost V-6 turbocharged engine, said to boost fuel economy by 20 percent and reduce $CO_2$ emissions by 15 percent. It is likely that other engine manufacturers will follow Ford in the use of turbochargers to take advantage of their ability to increase power from smaller engines while, at the same time, improve fuel mileage and lower emissions. Anything that improves performance and lowers the cost of small turbochargers will be a help in this effort.

The compressor component of a turbocharger comprises a compressor wheel, driven by the turbine, a diffuser section peripherally outboard of the compressor wheel, and a surrounding casing that collects the air from the diffuser and delivers it to the air intake system of the engine.

The compressor wheel imparts a static pressure increase to the air and accelerates it to a high velocity at its outlet. This static pressure rise is customarily about half of the total pressure rise that occurs in the compressor. The remaining half of the total pressure rise occurs in the diffuser that converts the high air velocity, leaving the wheel, to pressure by decelerating the air as it passes through the diffuser section.

A typical turbocharger compressor that compresses 80° F. ambient intake air to three times atmospheric pressure will have an air discharge temperature of about 350° F., if its efficiency is 73%. Half of this temperature rise occurs in the compressor wheel so that the air temperature at the wheel outlet will be approximately 175° F. This is low enough for it to be used as a cooling media.

Most commercial turbochargers now use floating sleeve bearings that are capable of suppressing shaft instability and have achieved satisfactory durability on a variety of internal combustion engines. The floating sleeve bearing systems used in commercial turbochargers include a stationary thrust bearing to carry the axial loads generated by the rotor assembly. The friction loss associated with the thrust bearing, plus the friction losses in the inner and outer oil films of the floating sleeve bearings, results in a substantial total friction loss for the complete bearing system. This friction loss has been the motivation for the development of ball bearing systems for small turbochargers that have much lower friction losses and allow the turbocharger rotating assemblies to accelerate appreciably faster than those using the sleeve bearing systems. See U.S. Pat. No. 7,677,041 B2 for the disclosure of a successful ball bearing system.

The ball bearing systems require a means of carrying away the heat generated in the bearings when operating at very high speeds in small turbochargers. Normally, this is accomplished by using engine lubricating oil ducted through and around the bearings, and then returning the oil through piping to the engine crankcase. In some gasoline engine applications, where exhaust gas temperatures are high, the lube oil cooling is augmented by a cooling jacket in the bearing housing through which engine coolant is circulated to accomplish sufficient cooling of the bearings and the internal structural parts of the turbocharger. In applications where such cooling of the bearings is required, the location and installation of the turbocharger is complicated and made more expensive by the requirement for piping for the engine lubricant and/or engine coolant between the turbocharger and the internal combustion engine.

Engines that are required to produce high power at low engine speeds, diesel truck engines for example, or passenger car engines that need to accelerate quickly, require turbochargers that are capable of supplying as high an air charge pressure as possible over the low engine speed range, up to the torque peak speed of the engine. To accomplish this, small-size turbines that have turbine casings with small throat areas, are used to force the turbocharger to rotate at as high a speed as possible over the low speed range of the engine. In order to prevent these turbines from operating the turbocharger above its rated speeds over the high speed range of the engine, exhaust gas bypass valves, knows as waste gates, are employed to bypass exhaust gas around the turbine wheel to limit the maximum speed of the turbocharger.

A predetermined maximum air charge pressure is used to actuate the waste gate that is usually built into the turbine casing and, by bypassing exhaust gas around the turbine wheel, the turbocharger speed can be held constant over the high speed range of the engine, namely, above the torque peak speed, where there is excess energy in the engine exhaust gas. This system requires a mechanism actuated by compressor discharge pressure to open the waste gate valve that is, as previously stated, usually built into the turbine casing. The waste gate valve and its operating mechanism represent a significant cost addition to the basic turbocharger.

Notwithstanding years of turbocharger design, development and production, the use of turbochargers remains complicated by their need for cooling of the internal parts of the turbocharger, including the bearings that carry the rotating assembly of the turbocharger and are heated, not only by the friction losses of the bearings themselves, but also by the heat conducted through the rotating shaft from the turbine wheel, which is exposed to the hot exhaust gases of the internal combustion engine. The need for turbocharger cooling has required piping for delivery of the lubricant and/or the coolant from the internal combustion engine to the turbocharger at its location within the engine enclosure.

BRIEF SUMMARY OF THE INVENTION

One preferred embodiment of the invention is a turbocharger that is self-cooled by a flow of compressed air generated by the turbocharger compressor and delivered within the turbocharger to a cooling jacket withiry the bearing housing to cool the internal structure of the turbocharger, including the turbocharger bearings. This embodiment eliminates the need for cooling fluids from outside the turbocharger, their necessary piping and conduits and associated parts and labor and possibilities of unreliable operation. Where it is desirable to do so, the flow of cooling air can be increased by the addition of a pressure relief valve that opens at a predetermined pressure level to limit the maximum speed of the turbocharger to an acceptable level and eliminate the need for an exhaust gas waste gate.

Such a self-cooled turbocharger for an internal combustion engine can include an exhaust gas-driven turbine for driving a rotatable shaft, a compressor driven by the rotating shaft for generating a flow of compressed air for delivery to the cylinders of the internal combustion engine, a bearing housing enclosing a bearing carrier with bearings that carry the rotatable shaft, and means forming a conduit for a flow of compressed air from the compressor into the cooling jacket in the bearing housing. In a preferred embodiment of such a self-cooled turbocharger, the means forming the conduit can be simply holes in the housing for the compressor and bearing housing that form a passageway for the compressed air from the interior of the compressor into and through the bearing housing. The means forming the conduit for compressed air can include a pressure-operated relief valve that operates at a predetermined pressure to initiate, or increase, the flow of compressed air to the bearing housing and is preferably carried by the bearing housing.

Another embodiment of the invention provides an air-cooled turbocharger, where compressed air from the turbocharger compressor is conducted from the compressor to the cylinders of the internal combustion engine through an air-to-air aftercooler and an engine air intake manifold. A flow of cooling air is taken from a location downstream of the air-to-air aftercooler and flows through a conduit to the turbocharger bearing housing. Such embodiments can include an axial flow pressure-operated relief valve that can control the flow of the compressed air by initiating, or increasing, the flow when the pressure within the engine intake manifold reaches a predetermined level.

The invention can be accomplished by bleeding compressed air from the area behind the compressor wheel into the cooling jacket in the bearing housing where it can cool the internal parts of the turbocharger, and then allow the heated air to vent to the atmosphere. The air can be introduced into the bearing housing by means of simple drilled holes, leading from the area behind the compressor wheel into the cooling jacket. As the speed of the turbocharger increases, the pressure of the air behind the compressor wheel increases so that an increased flow of cooling air is bled into the bearing housing automatically to increase the air-cooling effect as exhaust temperatures increase.

The invention can also eliminate the expensive waste gates and actuation mechanisms in the hot exhaust system and employ a simple pressure relief valve in the cool part of the center section of the turbocharger to open when the compressor discharge pressure reaches a predetermined value and admit an increased amount of cooling air into the bearing housing. Compressed air is bled from the area behind the compressor wheel by small air passages (or drilled holes) that are always open or, as an alternative, can be combined with a larger pressure relief valve that communicates with the same area behind the compressor wheel. The pressure relief valve is fitted with a spring that holds the valve closed until a predetermined air charge pressure is reached. At this point, the spring force holding the relief valve closed is overcome, allowing the valve to open to admit a much larger quantity of cooling air into the cooling jacket of the turbocharger bearing housing. This additional flow of compressed air requires the turbine of the turbocharger to produce more power, which it is capable of doing, over the high speed range of the engine. Thus, in this invention, the excess energy in the exhaust gas is not discarded through a waste gate, but is used to provide the larger quantity of cooling air when the relief valve behind the compressor wheel opens. The amount of additional cooling air provided through the relief valve will absorb turbine power, and this absorption will increase as the engine speed reaches high values, thus preventing the excess energy in the exhaust gas from over-speeding the turbocharger.

The utilization of a bleed air hole and pressure relief valve is a unique method of cooling the hot internal components of a turbocharger and, concurrently, preventing the turbocharger from exceeding its maximum speed limit. This invention eliminates the conventional waste gates and the liquid cooling lines needed when engine coolant is used to cool the internal components of the turbocharger. Elimination of the waste gate and engine cooling lines results in a substantial cost saving since a simple spring-loaded relief valve is a reasonably inexpensive item.

If the air-cooled turbocharger of this invention also has a grease-lubricated bearing system, as disclosed in U.S. Pat. No. 7,025,579 B2, then the lube oil lines to and from the turbocharger are eliminated. Thus, the air-cooled, oil-less turbocharger can be remotely mounted from the engine; for example, in the vicinity of a vehicle muffler, thereby eliminating the long lube-oil lines and/or engine coolant lines to the turbocharger and back from the turbocharger to the engine. This amounts to another substantial cost saving as a result of implementing this invention.

Additionally, the air bleed hole and relief valve combination of this invention can be easily designed into a turbocharger that has a bearing system using engine lubricating oil, as disclosed in U.S. Pat. No. 7,677,041 B2, if it has a cooling jacket in the bearing housing. It would be implemented in the same manner as illustrated in FIG. 1 and FIG. 2.

DETAILED DESCRIPTION OF THE INVENTION

Figure 1:
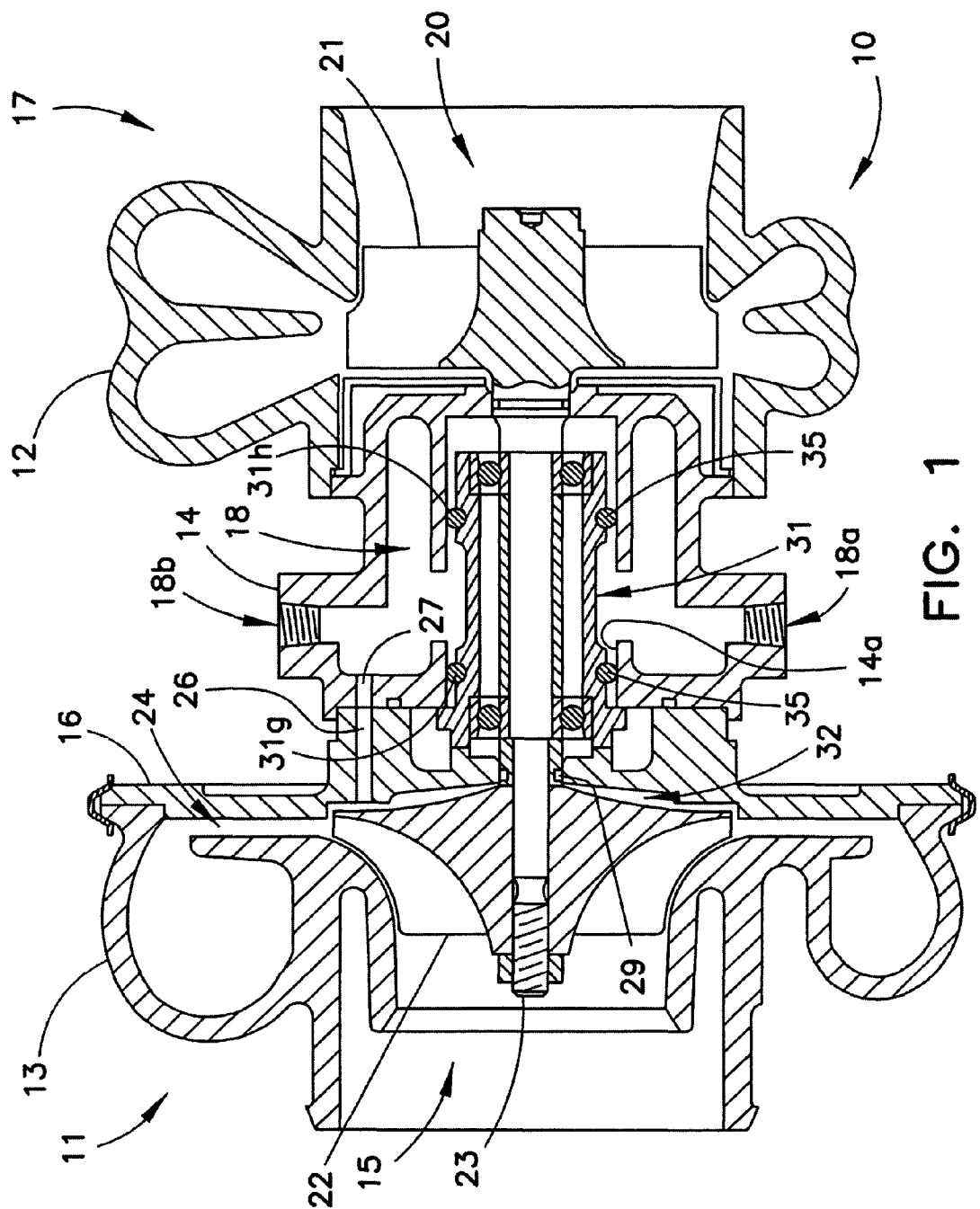
FIG. 1 is a cross-sectional view taken along a plane through the axis of a self-cooled turbocharger of the invention, showing compressed air bleed holes forming a conduit for compressed air.
Figure 2:
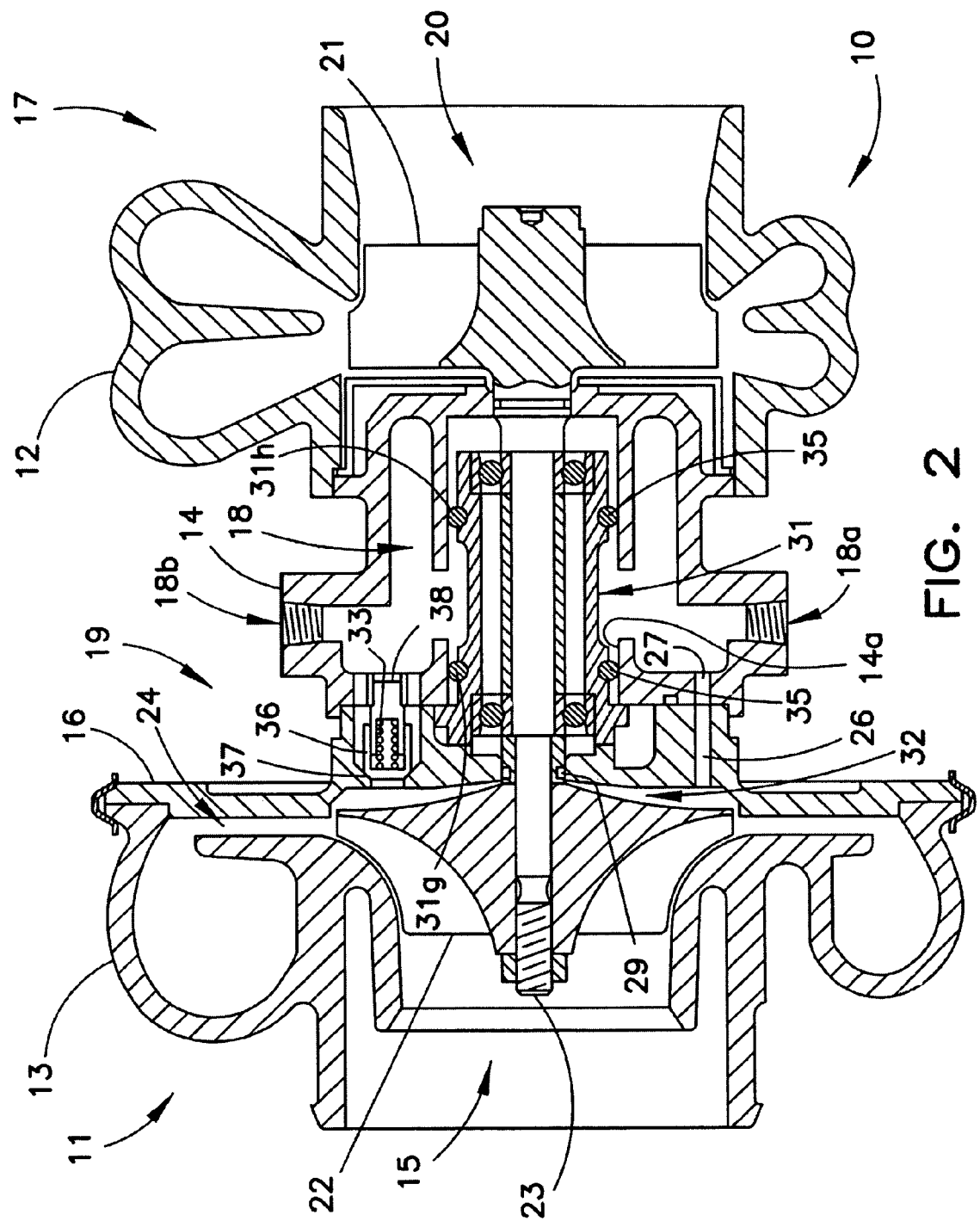
FIG. 2 is a cross-sectional view taken along a plane through the axis of another self-cooled turbocharger of the invention, showing compressed air bleed holes and a pressure relief valve forming a conduit for compressed air.

As noted above, the invention provides an air-cooled turbocharger, which may, in a preferred embodiment be self-cooled. FIG. 1 illustrates a self-cooled embodiment of the invention where a flow of compressed air from compressor 11 is provided through a compressed air conduit 26,27 to a cooling jacket 18 of the turbocharger bearing housing 14. FIG. 2 also illustrates a self-cooled embodiment of the invention which includes, in addition to a compressed air conduit 26, 27, a pressure relief valve 19, which can open at a predetermined pressure within compressor 11 to initiate a larger flow of compressed air into the bearing housing cooling jacket. As illustrated in FIGS. 1 and 2 the self-cooled turbocharger of the invention includes an exhaust-driven turbine 17 for driving a rotatable shaft 23, a compressor wheel 22 driven by the rotatable shaft 23 for generating a flow of compressed air for delivery from the compressor casing 13 to the cylinders of an internal combustion engine (not shown), a bearing housing 14 enclosing, the cooling jacket 18, a bearing assembly 31 that provides the bearings for the rotatable shaft 23, and means 26,27 forming a conduit for a flow of compressed air from the area 32 behind the compressor wheel 22 into the cooling jacket 18 of the bearing housing 14. A piston ring seal groove 29 is provided in a spacer which, clamps the inner race of the bearing assembly 31 between the facing hubs of the turbine wheel 17 and the compressor wheel 22 to rotate with the rotatable shaft 32.

More specifically, FIGS. 1 and 2 illustrate a turbocharger 10 that employs a grease-lubricated bearing system 31, as disclosed in U.S. Pat. No. 7,025,579 B2. Elastomeric members 35 are seated in grooves 31g and 31h in the bearing carrier. They function to seal the cooling jacket 18 in the bearing housing 14 and insulate the bearing housing 31 from shock and vibrations. Elastiomeric members 35 are pressed against the bore 14a in the bearing housing 14 to completely seal the cooling jacket 18 against leakage.

The turbocharger illustrated in FIG. 1 is an example of a machine in which this invention may be advantageously employed. FIG. 1 illustrates a turbocharger 10 of the type frequently used to supply charge air to the cylinders of an internal combustion engine. As well known in the art, the turbocharger 10 has stationary housings comprised of an exhaust gas volute 12, a compressor casing 13, a back plate 16, and a bearing housing 14 that encompasses the stationary bearing assembly 31. The rotating assembly 20 is driven by the action of exhaust gas from an internal combustion engine (not shown), directed from the exhaust gas volute 12, through the turbine wheel 21, of the rotating assembly 20. Rotation of the turbine wheel 21 drives the compressor wheel 22 that is mounted on the rotatable shaft 23, which is carried within the bearing housing 14 of the turbocharger 10 by the bearing assembly 31. The compressor wheel 22, when rotating, draws air into the air inlet 15 and directs the air through diffuser section 24 into the compressor casing 13. The compressed air leaves compressor casing 13 to enter the air induction system (as shown, for example, in FIG. 4) of an internal combustion engine.

The bearing housing 14 of turbocharger 10 contains a cooling jacket 18 that must be supplied with a cooling medium to carry away heat transferred from the hot exhaust gas volute 12 into bearing housing 14, and the heat generated in the bearing assembly 31 by the action of the ball bearings there within. Prior to this invention, the cooling medium has been liquid engine coolant introduced into the bearing housing at opening 18a. The engine coolant circulates through the cooling jacket 18, exits the bearing housing 14 at opening 18b and returns to the engine cooling system.

This invention eliminates the liquid cooling medium taken from the engine cooling system, using instead compressed air generated by the turbocharger compressor 22, making the cooling system completely self-contained within the turbocharger housing. In this embodiment, the opening 18b is closed, for example, by a threaded plug, and air is bled from the area 32 behind the compressor wheel 22, through a passage 26 provided in the back plate 16, and through passage 27 in the bearing housing wall into the cooling jacket 18 in the bearing housing 14. The cooling air circulates through the cooling jacket 18 and exits to atmosphere through opening 18a Since the air in the area 32 behind the compressor wheel 22 is compressed up to approximately one half the total pressure generated by the compressor, there is sufficient pressure differential to cause the compressed air to flow through the cooling jacket 18 and out to the atmosphere through opening 18a, thereby cooling the internal surfaces of the bearing housing and the outside diameter of the bearing assembly 31.

The size of the compressed air bleed holes, e.g. passages 26,27, can be varied to change the amount of cooling air introduced into the cooling jacket 18. Turbochargers that are used on internal combustion engines, such as gasoline engines that are highly rated and have high exhaust gas temperatures would require more cooling airflow than other engines, such as diesel engines, where the exhaust gas temperatures are not as high. The cooling air bleed hole size can be tailored to match the cooling requirements of various turbocharger/engines combinations.

Another primary feature of this invention is the use of a pressure relief valve 19 in addition to the compressed air bleed passages 26 and 27. FIG. 2 illustrates one embodiment of a relief valve 19 where the valve seat 37 is located in the back plate 16 and a valve guide 38 is provided in the wall of the bearing housing 14. Valve 36 seats on the valve seat 37 and is held in place by spring 33. Compressed air bleed holes 26 and 27 allow a measured amount of cooling airflow into the cooling jacket 18 at all times. The spring 33 holds the valve 36 against the valve seat 37 until the pressure behind the compressor wheel 22 overcomes the spring force, moving the valve 36 away from seat 37 to allow a much larger amount of cooling air to flow into the cooling jacket 18.

The spring 33 can be selected to match a predetermined air charge pressure and allow the valve to open at that pressure in order to control the maximum speed of the turbocharger. In this manner, the pressure relief valve 19 acts similarly to an exhaust gas bypass valve in the turbine casing of a turbocharger that opens when a predetermined value of air pressure is reached, thereby limiting the maximum speed of the turbocharger.

When the pressure relief valve 19 opens, allowing an increased quantity of compressed air to be introduced into the cooling jacket 18, the turbine 17 of the turbocharger must provide an increased amount of horsepower to the compressor wheel 22. The pressure relief valve 19 can be designed to open over the high speed range of the engine where there is an excess of energy in the engine exhaust gas. This excess exhaust energy is then utilized to provide additional power required by the increased cooling airflow when the pressure relief valve 19 is opened at the predetermined charge air pressure level.

This invention provides a unique, compact arrangement of components that provide a controlled flow of cooling air into the center section of a turbocharger and, additionally, provides a means of controlling the maximum charge air pressure delivered to an engine air intake manifold system, thereby limiting the maximum speed of the turbocharger over the high engine speed range. The simplicity of the pressure relief valve/cooling air hole combination is illustrated in FIG. 2. They are self-contained within the turbocharger and located in the cool side, away from the hot turbine parts.

Figure 3:
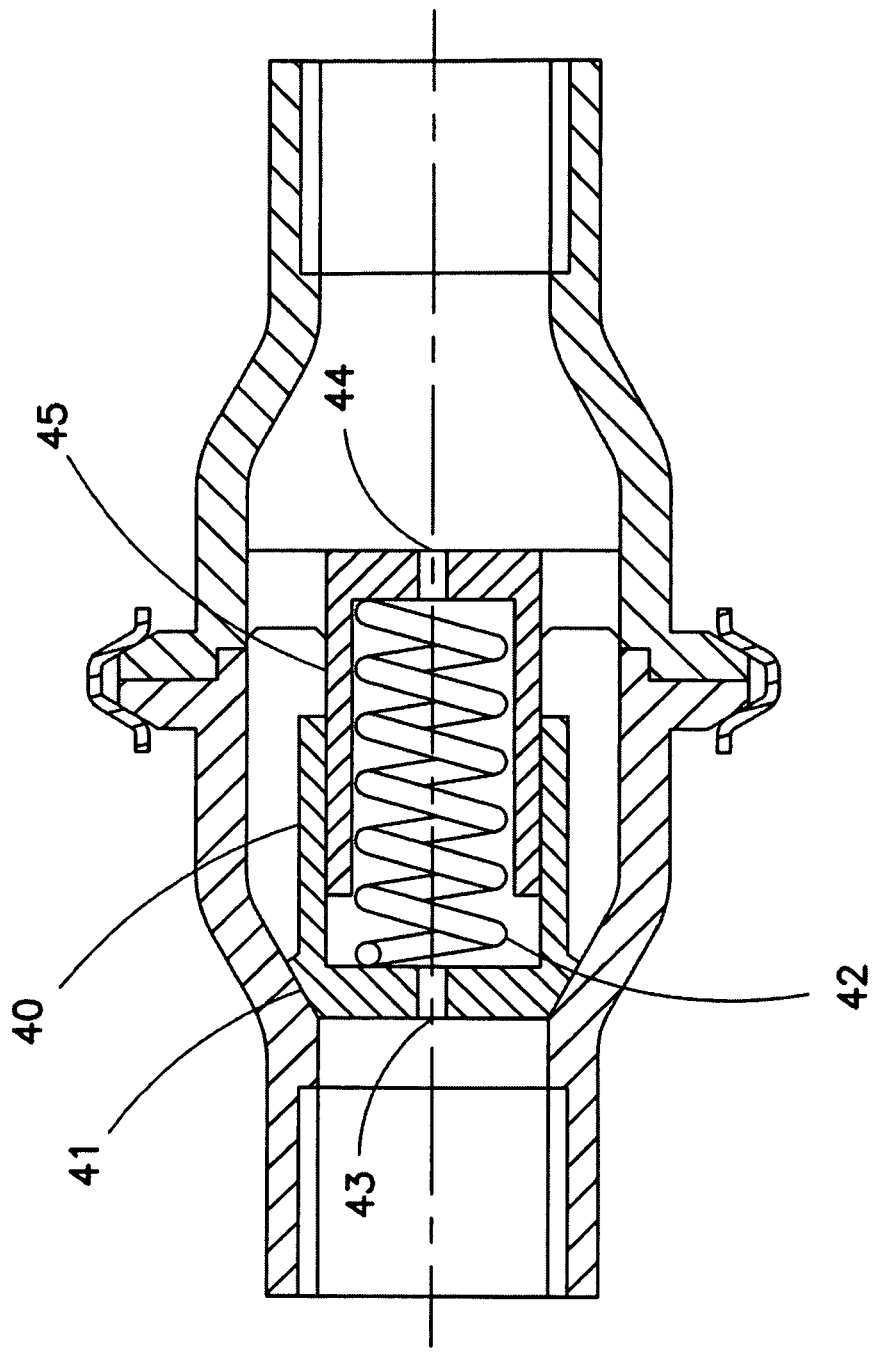
FIG. 3 is an illustration of an axial flow pressure relief valve used in the invention combined with cooling air bleed holes.
Figure 4:
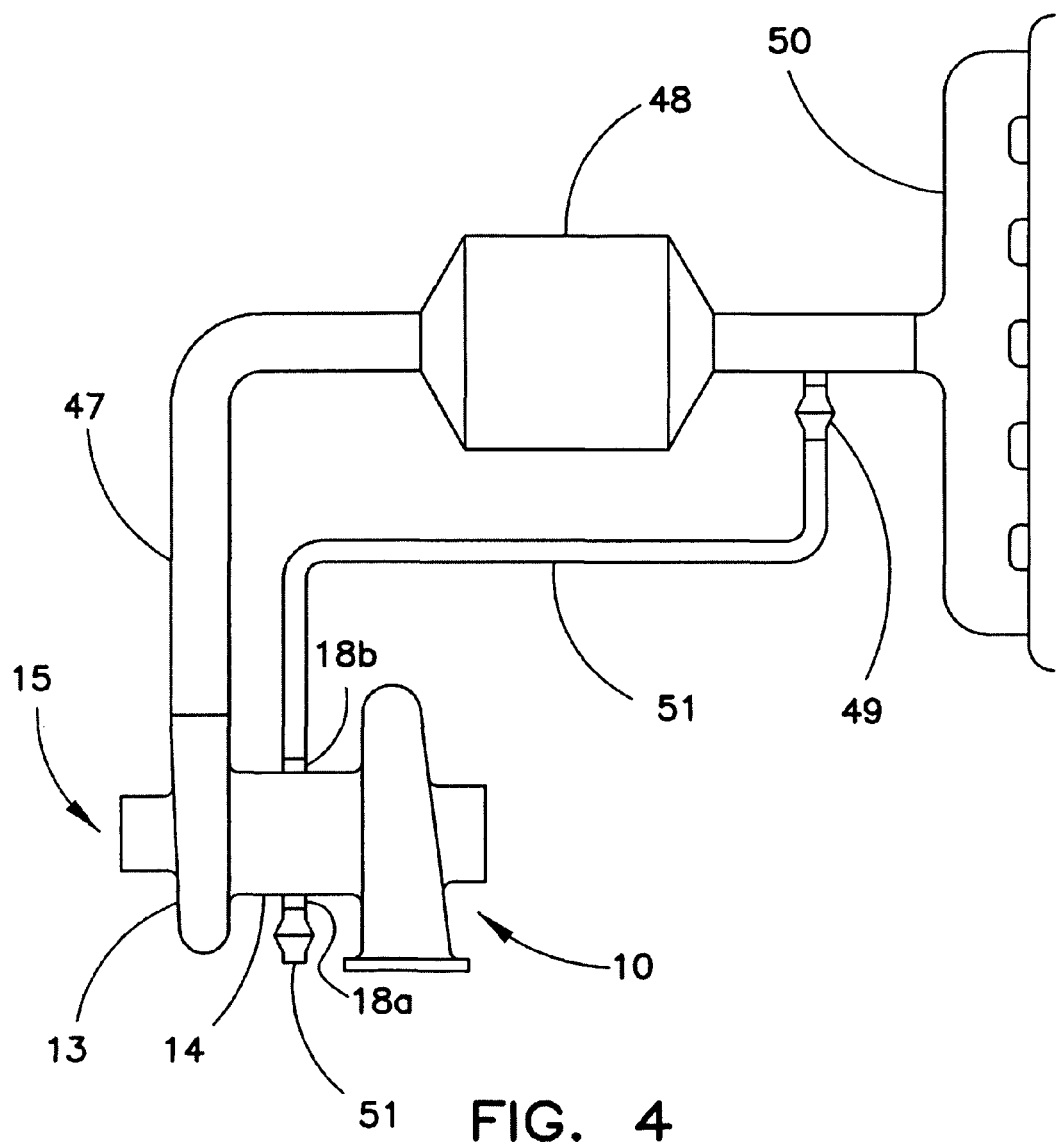
FIG. 4 illustrates a turbocharger with its bearing housing cooled by compressed air ducted from an engine air intake system through an axial flow pressure relief valve with cooling air bleed holes.

In another embodiment of this invention, illustrated in FIGS. 3 and 4, for example, an axial flow pressure relief valve with the cooling air bleed holes can be located in the engine air intake system downstream from an air-to-air aftercooler, where the compressed air temperature is low enough for cooling the internal parts of the turbocharger.

Referring again to a typical turbocharger that compresses 80° F. ambient air to three times atmospheric pressure, there will be an air discharge temperature from the compressor of 350° F. If this turbocharger is mounted on an engine that is equipped with an air-to-air aftercooler, then the majority of the compressed air rise is removed by the aftercooler. In this example, the air temperature rise due to compression is 350−80=270° F. If the aftercooler effectiveness is 80%, the temperature drop through the aftercooler will be 216° F. Therefore, the compressed air in the engine intake manifold will be 134° F. This temperature is low enough to be used for cooling airflow and can be ducted to the turbocharger housing through an axial flow pressure relief valve located in the engine intake system.

One type of a combination of an axial flow pressure relief valve with cooling air bleed holes is illustrated in FIG. 3. This combination valve can be located in the engine intake manifold system at any convenient place downstream of the air-to-air aftercooler. Valve 40 is held against valve seat 41 by spring 42 until a predetermined level of air pressure supplied by the turbocharger compressor is reached. At this level, the force exerted by spring 42 is overcome, forcing valve 40 away from seat 41, allowing cooling air to flow through piping to the turbocharger bearing housing. When the valve is closed, a continuous reduced flow of cooling air is provided through hole 43 in valve 40 and through hole 44 in valve guide 45 and flows through the piping to the turbocharger bearing housing. The cooling airflow provided by this combination pressure relief valve with cooling air bleed holes may be ducted to the turbocharger housing, entering at opening 18b and exiting to atmosphere at 18a, as shown in FIG. 1. In this embodiment of the invention, there would be no cooling air bleed holes internally in the turbocharger.

The axial flow pressure relief valve, shown in FIG. 3, located in the engine intake manifold can function, as previously described, to limit the maximum speed of the turbocharger over the high speed range of the engine.

FIG. 4 diagrammatically illustrates a turbocharger 10, where filtered ambient air 15 enters the compressor casing 13 of the compressor 11, is compressed, and is discharged into charge air piping 47, leading to an air-to-air aftercooler 48. The aftercooler 48 is usually mounted in the vehicle ahead of the radiator where ambient air is drawn through the aftercooler by the engine cooling fan and by forward motion of the vehicle. An axial flow pressure relief valve 49 with cooling air bleed holes is located downstream of the aftercooler 48, upstream of the engine air intake manifold 50, and the cooling air is ducted from the relief valve 49 through piping 51 to the turbocharger bearing housing 14, entering at 18b, and the cooling airflow cools the internal components of the turbocharger and exits the bearing housing 14 at opening 18a, passing through non-return valve 51 and on into atmosphere The non-return valve 51 can be of the same construction as the pressure relief valve illustrated in FIG. 3, but would not have bleed holes 43 and 44. The non-return version of the valve would contain a spring that would allow the valve to open at very low air pressure, of the order of one pound per square inch. Any operating condition of the engine that causes a vacuum to exist in the engine air intake system will cause the valve to close, preventing any unfiltered air from entering the engine air intake system.

The pressure relief valve 49 can be of the same construction, as illustrated in FIG. 3, containing cooling air bleed holes and a spring that holds the valve closed until a predetermined level of charge air pressure is reached. The relief valve then opens, allowing a greater amount of cooling air to flow to the turbocharger bearing housing and, at the same time, functions to limit the speed of the turbocharger, as previously described.

If an engine operating condition occurs where a vacuum exists in the compressor casing due to the engine running at low idle with a restricted air cleaner, the non-return valve 51, located at opening 18a in FIG. 4, prevents unfiltered air from entering the engine intake manifold system.

As those skilled in the art will recognize, the illustrated bearing housing 14 is like the bearing housings of many commercial turbochargers, except for the means forming a conduit for compressed air from the compressor into the bearing housing. The bearing housing is formed from a casting which includes two bosses, which are located generally above and below the bearings of the turbocharger and are provided with threaded holes 18a and 18b. In the prior art turbochargers, the openings 18a and 18b were connected with piping that conducted a flow of engine coolant, from the internal combustion engine to the bearing housing and returned the flow of engine coolant back to the internal combustion engine crankcase. The bearing housing 14 has been used herein to illustrate the embodiments of the invention with a reduced number of drawings.

In another preferred self-cooling embodiment of the invention, the bosses and threaded holes 18a and 18b are not needed and the portion of the bearing housing, where threaded hole 18b is shown, can be an uninterrupted peripheral wall of the bearing housing, and the portion of the bearing housing, where threaded hole 18a is shown, can be a simple opening formed in the peripheral wall of the bearing housing to allow the compressed air conducted into the cooling cavity 18 of the bearing housing to escape to the ambient atmosphere.

The advantages of turbochargers and turbocharged engines using this invention include:
1. Elimination of the lines carrying engine coolant to and from the bearing housing when liquid coolant is the cooling medium.
2. The elimination of the expensive exhaust gas bypass valves used to control turbocharger maximum speed.
3. Combined with a turbocharger that uses grease-lubricated bearings, the turbocharger can be remote-mounted from the engine, thereby eliminating lube oil and liquid coolant lines of extended length connected from the engine to the turbocharger and back to the engine.
4. Provides a much less expensive method of cooling the internal components of a turbocharger and much less expensive means of limiting its maximum speed.
5. Provides a turbocharger with self-contained means of cooling internal parts and limiting turbocharger maximum speed.

It is intended that the foregoing detailed description be regarded as illustrative rather than limiting. Other designs of a relief valve and cooling air passages can easily be devised by those skilled in the art. While the currently known preferred embodiments of this invention have been shown herein, other embodiments may be devised without departing from the scope of the following claims.

What is claimed is:
1. An air-cooled turbocharger for an internal combustion engine, comprising:
   an exhaust-driven turbine for driving a rotatable shaft,
   a compressor, with a compressor wheel, driven by the rotatable shaft for generating a flow of compressed air for delivery to the cylinders of an internal combustion engine,
   a bearing housing enclosing a bearing carrier that carries the rotatable shaft, said bearing housing also forming a cooling jacket around the bearing carrier, said cooling jacket having an opening to ambient atmosphere having a non-return valve therein, and means for forming a conduit for a flow of compressed air from behind the compressor wheel into the cooling jacket of the bearing housing.

2. The turbocharger of claim 1, wherein the compressor includes a compressor wheel carried by the rotatable shaft and operatively associated with a compressor casing, including a back plate held against the bearing housing, said means forming a conduit for a flow of compressed air from the compressor to the cooling jacket of the bearing housing comprising a passageway formed in the back plate and the bearing housing.

3. The turbocharger of claim 2, wherein the passageway is formed by holes in the back plate and bearing housing.

4. The turbocharger of claim 3, wherein the holes may be formed by drilling or casting in the back plate and bearing housing.

5. An air-cooled turbocharger for an internal combustion engine, comprising:
- an exhaust-driven turbine for driving a rotatable shaft,
- a compressor with a compressor wheel, driven by the rotatable shaft for generating a flow of compressed air for delivery to the cylinders of an internal combustion engine,
- a bearing housing enclosing a bearing carrier that carries the rotatable shaft, said bearing housing also forming a cooling jacket,
- means for forming a conduit for a flow of compressed air from behind the compressor wheel to the bearing housing, and
- a pressure-operated valve for controlling the flow of compressed air to the cooling jacket.

6. The turbocharger of claim 5, wherein the pressure-operated valve opens at a predetermined pressure to admit a flow of compressed air from the compressor and limits the speed of the rotatable shaft.

7. The turbocharger of claim 5, wherein the pressure operated valve is carried in the bearing housing directly behind the compressor wheel.

8. The turbocharger of claim 5, wherein the means forming a conduit for compressed air also includes at least one additional conduit providing an uncontrolled flow of compressed air to the bearing housing.

9. A self-cooled turbocharger for an internal combustion engine, comprising:
- a turbine section including a turbine wheel and a turbine housing for connection with a flow of exhaust gas from an internal combustion engine,
- a rotatable shaft driven by the turbine wheel,
- a compressor section including a compressor wheel driven by the rotatable shaft,
- a compressor wheel housing operatively associated with the compressor wheel to supply cylinder charge air to the cylinders of the internal combustion engine,
- a bearing housing between, and connected with, the turbine housing and the compressor housing and including bearings that rotatably carry the rotatable shaft,
- said compressor housing forming an air inlet to the compressor wheel and a compressed air outlet for connection with the cylinders of the internal combustion engine,
- said compressor housing including a back plate located between the compressor wheel and the bearing housing,
- said back plate and bearing housing forming a conduit for a flow of compressed air from behind the compressor wheel into a cooling jacket within the bearing housing around the bearings,
- said conduit including a pressure-operated valve carried by the bearing housing and including a hole in communication with the hole formed in the backplate, and
- said bearing housing also forming an opening to ambient pressure so the expansion and flow of compressed air through the cooling jacket cools the internal components of the turbocharger.

10. The turbocharger of claim 9, wherein said conduit comprises at least one hole formed in the back plate and in the bearing housing.

11. The turbocharger of claim 9, wherein the pressure-operated valve comprises a spring-loaded relief valve.

12. The turbocharger of claim 9, wherein the pressure-operated valve, when opened at a predetermined pressure, permits an increased flow of compressed air to the cooling jacket and limits the speed of rotation of the rotatable shaft.

13. An internal combustion engine turbocharger, comprising: an exhaust gas-driven turbine for driving a rotatable shaft,
- a compressor with an engine intake air compressor wheel, said engine intake air compressor wheel being driven by the rotatable shaft driven by the exhaust gas-driven turbine,
- a bearing housing carrying bearings for the rotatable shaft,
- an interior of said bearing housing having a cooling jacket for said bearings and said rotatable shaft,
- means within the turbocharger for directing a flow of compressed cooling air from the compressor to the interior of the cooling jacket of said bearing housing, and
- said bearing housing having an opening in communication with ambient atmosphere, said opening having a non-return valve engaged between said bearing housing and said ambient atmosphere.

14. The turbocharger of claim 13, wherein the compressor includes a compressor housing providing a reduced pressure behind the compressor wheel from that generated by said wheel for said air intake, and
- said compressor housing and said bearing housing being interconnected by a passageway within the turbocharger for directing cooling compressed air from behind the compressor wheel to the cooling jacket of said bearing housing.

15. The turbocharger of claim 14, wherein the compressor housing includes a back plate and said passageway within the turbocharger for directing cooling compressed air from behind the compressor to the interior of the bearing housing comprises communicating holes in the compressor back plate and the bearing housing.

\* \* \* \* \*